US008409698B2

(12) United States Patent
Byers et al.

(10) Patent No.: US 8,409,698 B2

(45) Date of Patent: Apr. 2, 2013

(54) IMAGE TRANSFER PRODUCT INCLUDING A THIN PRINTING SURFACE LAYER

(75) Inventors: Joseph L. Byers, Inman, SC (US); W. Toriran Flint, Asheville, NC (US); Samuel R. Shuman, Bozeman, MT (US)

(73) Assignee: Day International, Inc., Dayton, OH (US)

( * ) Notice: Subject to any disclaimer, the term of this patent is extended or adjusted under 35 U.S.C. 154(b) by 395 days.

(21) Appl. No.: 12/275,611

(22) Filed: Nov. 21, 2008

(65) Prior Publication Data

US 2009/0142587 A1 Jun. 4, 2009

Related U.S. Application Data

(60) Provisional application No. 60/991,226, filed on Nov. 30, 2007.

(51) Int. Cl.

| | |
|---|---|
| ***B32B 27/32*** | (2006.01) |
| ***B32B 5/16*** | (2006.01) |
| ***B32B 27/00*** | (2006.01) |
| ***B32B 27/40*** | (2006.01) |
| ***B32B 25/04*** | (2006.01) |
| ***B32B 5/26*** | (2006.01) |
| ***B32B 27/12*** | (2006.01) |
| ***B41N 1/00*** | (2006.01) |
| ***B29C 47/00*** | (2006.01) |

(52) U.S. Cl. ..................... 428/220; 428/332; 428/423.1; 428/423.9; 428/492; 101/453; 156/244.11; 442/381; 442/394

(58) Field of Classification Search ........................ None
See application file for complete search history.

(56) References Cited

U.S. PATENT DOCUMENTS

| | | | | |
|---|---|---|---|---|
| 3,147,698 | A | 9/1964 | Ross | |
| 3,211,701 | A | 10/1965 | Muller et al. | |
| 4,481,282 | A | 11/1984 | Obata et al. | |
| 4,812,357 | A * | 3/1989 | O'Rell et al. | 442/224 |
| 6,071,620 | A | 6/2000 | Kuczynski et al. | |
| 6,615,721 | B1 | 9/2003 | Vrotacoe et al. | |
| 6,688,226 | B2 | 2/2004 | Rossini et al. | |
| 6,779,451 | B2 | 8/2004 | Vrotacoe et al. | |
| 2004/0213934 | A1 | 10/2004 | Abell, III et al. | |
| 2005/0074620 | A1 | 4/2005 | Stebnicki et al. | |

FOREIGN PATENT DOCUMENTS

| | | | |
|---|---|---|---|
| GB | 2089288 | A | 6/1982 |
| JP | 2003080864 | A | 3/2003 |

OTHER PUBLICATIONS

International Search Report and Written Opinion pertaining to International application No. PCT/US2008/084594 dated Feb. 26, 2009.

* cited by examiner

*Primary Examiner* — Sheeba Ahmed
(74) *Attorney, Agent, or Firm* — Dinsmore & Shohl LLP

(57) ABSTRACT

An image transfer product such as an offset printing blanket or sleeve is provided which comprises a very thin printing surface layer in combination with a smooth image reinforcement layer comprising a polymeric film, a fabric, or a polymer-coated fabric. The thin printing surface layer has a thickness between about 0.001 to about 0.012 inches (about 0.025 to about 0.3 mm). The image transfer product is more efficiently manufactured due to reduced solvent usage and reduced number of coating passes, and in use, exhibits uniform feed, web control, and registration characteristics.

18 Claims, 2 Drawing Sheets

IMAGE TRANSFER PRODUCT INCLUDING A THIN PRINTING SURFACE LAYER

CROSS-REFERENCE TO RELATED APPLICATIONS

This application claims the benefit of U.S. Provisional Application No. 60/991,226, filed Nov. 30, 2007, entitled IMAGE TRANSFER PRODUCT INCLUDING A THIN PRINTING SURFACE LAYER. The entire contents of said application are hereby incorporated by reference.

BACKGROUND OF THE INVENTION

The present invention relates to an image transfer product such as a printing blanket or printing sleeve, and more particularly, to an improved image transfer product including a thin printing surface layer in combination with a smooth image reinforcement layer.

One of the most common commercial printing processes is offset lithography. In this printing process, ink is offset from a printing plate to a rubber-surfaced printing blanket mounted on a blanket cylinder before being transferred to a substrate, such as paper. Typically, the printing blanket includes at least one base ply which comprises the blanket carcass and an outer printing surface layer which is typically formed from a polymeric rubber material. The printing surface layer is adapted to carry and transfer liquid printing ink.

Most printing surface layers currently in use typically comprise natural or synthetic rubber materials which require the use of a solvent to dissolve the rubber material so that it may be coated, in numerous thin passes, onto the base ply. The solvent must then be evaporated prior to curing. Alternatively, the natural or synthetic rubber materials may be calendared onto the base ply in a single pass, but at great expense due to the need to adequately control gauge. In both methods, the rubber materials must be cured under pressure, which is a time consuming process.

Accordingly, there is still a need in the art for an improved method of making an image transfer product such as a printing blanket or sleeve including a printing surface having the desired gauge and texture for receiving and transferring ink without the drawbacks of prior methods.

SUMMARY OF THE INVENTION

The present invention meets that need by providing an image transfer product such as an offset printing blanket or sleeve which utilizes a very thin printing surface layer in combination with a smooth image reinforcement layer comprising a polymeric film, a fabric, or a polymer-coated fabric. The image transfer product is more efficiently manufactured due to reduced solvent usage and reduced number of coating passes, and in use, exhibits uniform feed, web control, and registration characteristics.

According to one aspect of the present invention, an image transfer product comprising a printing blanket or sleeve is provided comprising a thin printing surface layer having a thickness of between about 0.001 to about 0.012 inches (about 0.025 to about 0.3 mm) over an image reinforcement layer selected from a polymeric film, a fabric, or a combination thereof. As used herein, the term "over" refers to a layer or structure formed above or in contact with the uppermost surface of another layer or structure. By "image reinforcement layer," we mean a layer of supporting material that will stabilize and prevent unwanted movement of the printing surface when exposed to normal operating conditions over the life of the product.

Where the image transfer product comprises a printing blanket, the blanket construction preferably includes a blanket carcass, where the image reinforcement layer is either over the blanket carcass or comprises the uppermost layer of the blanket carcass. The thin printing surface layer is over the image reinforcement layer. In one embodiment, the blanket carcass comprises at least one base ply comprised of fabric, film, a polymeric composite material, or metal.

Where the image transfer product comprises a printing sleeve, the sleeve preferably includes a base sleeve comprised of a rigid metal, polymer, or polymer composite, where the thin printing surface layer and image reinforcement layer are over the base sleeve.

The image transfer product may further include a compressible layer within the blanket carcass or over the base sleeve.

Preferably, the printing surface layer has a thickness of between about 0.002 to about 0.007 inches (about 0.05 to about 0.18 mm). The printing surface layer is preferably selected from nitrile rubber, hydrogenated nitrile butadiene rubber, polysulfide rubber, butyl rubber, EPDM rubber, thermoplastic and thermosetting polyurethanes, and mixtures or alloys of the above materials.

The image reinforcement layer is preferably selected from a polymeric film, a fabric, or a combination thereof. In one embodiment of the invention, the image reinforcement layer comprises a polymeric film layer selected from nitrile rubber, hydrogenated nitrile butadiene rubber, butyl rubber, EPDM rubber, polyvinyl chloride, polyurethane, and mixtures or alloys of the above materials.

In another embodiment of the invention, the image reinforcement layer may comprise a smooth, gauge-consistent fabric such as woven polyester.

In yet another embodiment of the invention, the image reinforcement layer comprises a fabric layer which has been impregnated or coated with a polymeric coating or which has a polymeric film laminated to its surface such that a smooth surface is obtained to which the printing surface layer can be applied. The fabric layer preferably comprises a woven polyester. The polymer comprising the coating or film may be selected from nitrile rubber, hydrogenated nitrile butadiene rubber, butyl rubber, EPDM rubber, polyvinyl chloride, polyurethanes, and mixtures or alloys of the above materials.

In an embodiment of making an image transfer product having a thin printing surface layer, a blanket carcass or base sleeve is provided. An image reinforcement layer selected from a polymeric film, a fabric, or a combination thereof is applied to the blanket carcass or base sleeve. A printing surface layer having a thickness of between about 0.001 to 0.012 inches (about 0.025 to about 0.3 mm) is then applied to the image reinforcement layer.

In one embodiment, the image reinforcement layer comprises a polymeric film which is applied in liquid form by knife-over-roll coating, calendering, pneumatic and electrostatic spray coating, slot die coating, extrusion-lamination, or other means known in the art. In another embodiment, the image reinforcement layer is in the form of a polymeric film which is applied by lamination.

The printing surface layer may be applied to the image reinforcement layer by a number of methods including knife-over-roll coating, calendering, non-electrostatic and electrostatic spray coating, extrusion-lamination, or other means known in the art. Alternatively, the printing surface layer can be extruded or calendered in web form as a free or supported film which can be laminated to the image reinforcement layer by bonding methods known in the art such as adhesive coating and lamination or by direct lamination using heat and/or pressure.

Accordingly, it is a feature of the present invention to provide an image transfer product including a very thin printing surface layer in combination with a smooth image reinforcement layer. Other features and advantages of the invention will be apparent from the following description, the accompanying drawings, and the appended claims.

DETAILED DESCRIPTION OF THE PREFERRED EMBODIMENTS

We have found that the use of an image reinforcement layer having a smooth surface allows the use of a very thin printing face layer in a blanket or sleeve construction. The smooth image reinforcement layer provides sufficient gauge and surface uniformity so that a much thinner print face can be applied without the problem of threads, patterns, or textures showing through from the underlying reinforcement layer to the printing face or to the printed image. The printing surface layer of the present invention has a thickness of from about 0.001 to 0.012 inches (about 0.025 to about 0.3 mm), while prior art printing surface layer thicknesses are typically from about 0.012 to 0.020 inches (0.3 mm to 0.51 mm) in thickness.

And, because a much thinner printing surface layer requires less rubber material, the amount of solvent needed for the surface layer is reduced. In addition, where the image reinforcement layer is formed from a 100% solids material such as thermoplastic polyurethane (TPU), cast urethane, or TPU-coated fabric, no solvent-based adhesive is needed to bond the image reinforcement layer to the blanket carcass; rather, the image reinforcement layer can be directly coated or laminated onto the carcass.

Figure 1:
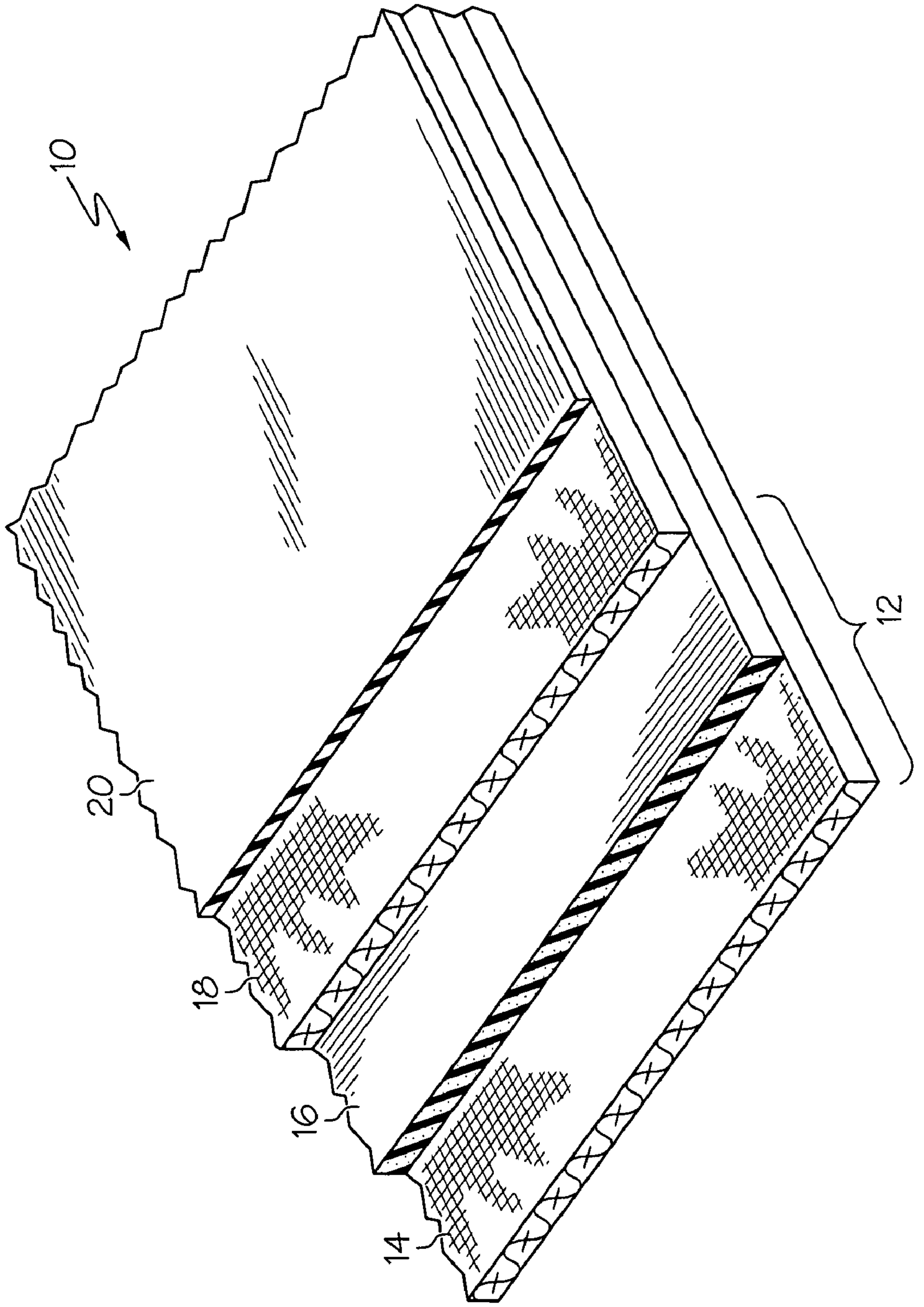
FIG. 1 is a cross-sectional view of a printing blanket construction including an image reinforcing layer and a thin printing surface layer in accordance with an embodiment of the invention.

Referring now to FIG. 1, an image transfer product 10 is shown in the form of a printing blanket which includes a blanket carcass 12. Typically, the blanket carcass or sleeve comprises a compressible layer and one or more underlying base layers, but may also include the image reinforcement layer as the uppermost layer. In the embodiment shown in FIG. 1, the blanket carcass 12 comprises a fabric base ply 14 and a compressible layer 16. The image transfer product 10 further includes an image reinforcement layer 18 and a very thin printing surface layer 20.

In one embodiment, the image reinforcement layer comprises a thermoplastic polyurethane. Suitable thermoplastic polyurethanes for use as the image reinforcement layer are polyester or polyether-based and include those commercially available from Huntsman Polyurethanes, Dow, and Bayer. Polyester-based polyurethanes are preferred for use due to their chemical resistance. It should also be appreciated that alloys of the above-described thermoplastic polyurethanes with conventional rubber materials such as nitrile rubber, EPDM, polysulfide, and butyl rubber may also be used.

Where the image reinforcement layer comprises a thermoplastic polyurethane, the thermoplastic polyurethane is preferably extrusion coated or heat laminated as a preformed film onto the blanket carcass or sleeve to provide a smooth and uniform surface.

Alternatively, the image reinforcement layer may comprise a cast polyurethane (also referred to herein as a thermosetting polyurethane). The polyurethane is typically supplied in the form of a flowable 100% solids material that is applied to the carcass by dip coating, electrostatic or non-electrostatic spray coating, reverse roll coating, knife-over-roll coating, slot die coating, or other means well known in the art. Preferably, the cast polyurethane is applied to the blanket carcass by slot die or knife-over-roll coating. The cast polyurethanes are generally based on polyesters or polyethers. Polyester-based polyurethanes are preferred for use due to their chemical resistance. Depending on the specific urethane employed, the curing mechanism may comprise heat, UV light, or moisture. Optionally, the application of heat may be used to activate and/or accelerate curing.

Suitable polyurethane casting compositions for use in the present invention are described in U.S. Pat. No. 3,211,701, the disclosure of which is hereby incorporated by reference. Such compositions comprise the reaction product of an isocyanate-terminated prepolymer with an organic chain extender or crosslinking agent (which may be a polyamine or a polyhydric alcohol) with a functionality of at least 2 and a molecular weight from 18 to 600. The isocyanate-terminated prepolymer is prepared from a hydroxyl-terminated polyester, polyether, or polybutadiene polyol or mixtures thereof having a molecular weight of 300 to 6000 and a functionality of at least 2 and optionally, a hydroxyl containing chain extending agent with a functionality of at least 2 and a molecular weight of 18 to 600, with an excess of organic diisocyanate.

We have found that the use of thermoplastic or thermosetting polyurethanes for the image reinforcement layer provides advantages over the use of prior art rubber compounds in that the polyurethanes may be used as 100% solids materials. Accordingly, there is no solvent which needs to be added prior to coating or removed prior to curing.

Regardless of the type of polymer used as the image reinforcement layer, the polymer is applied directly to the uppermost surface of the blanket carcass, e.g., the compressible layer or, in the case of a non-compressible blanket, the base ply or plies.

In embodiments where the image reinforcement layer comprises a fabric, the fabric layer is preferably applied to the blanket carcass or sleeve by lamination. For example, where the blanket carcass includes a compressible layer, the fabric is laminated to the compressible layer either before or after the compressible layer is cured. The fabric is preferably laminated with an adhesive tie-layer which is applied to the compressible layer and/or the fabric layer. Such a tie layer may comprise conventional adhesive materials known in the art as well as thermosetting and thermoplastic polyurethanes. These materials may be applied to the uppermost surface of the blanket carcass and/or to the lowermost surface of the image reinforcement fabric in order to facilitate an adequate adhesive bond between the image reinforcement layer and the carcass.

Alternatively, the compressible layer may be formulated to have sufficient adhesive properties that an adhesive is not necessary. In such an embodiment, the lamination process is preferably performed prior to curing.

The fabric used for the image reinforcement layer should be smooth with sufficient gauge and surface uniformity such that the printing surface layer may be applied uniformly over the reinforcement layer, leaving no visible fabric pattern. A suitable fabric for use in the present invention comprises a woven polyester fabric having low denier warp and fill yarns, i.e., a denier of 150 or less. Such a fabric is commercially available from Precision Fabrics Group, Inc. Other fabrics may be used in the present invention as long as they are densely woven with fine (low denier), low linting yarns to provide a smooth, gauge-consistent surface.

In embodiments where the image reinforcement layer comprises a fabric coated with a polymer, the polymer may be applied by a number of known methods including calendering, knife-over-roll coating, slot die coating, gravure, reverse roll, spraying, dipping or extrusion coating. Where the polymer applied to the fabric is of a thermoplastic nature, such as a thermoplastic polyurethane, it may be applied by extrusion coating or by heat laminating a preformed film. Where the polymer is a thermosetting polymer, it may be applied by dip coating, electrostatic or non-electrostatic spray coating, reverse roll coating, knife-over-roll coating, slot die coating, or other means well known in the art.

The polymer coated fabric is then applied to the blanket carcass or sleeve by lamination. It should be appreciated that the method chosen will vary depending on the material used. Preferred polymeric materials used for coating include nitrile rubber, hydrogenated nitrile butadiene rubber, butyl rubber, EPDM rubber, polyvinyl chloride, and polyurethanes. In a preferred embodiment, the polymer coating comprises a solvated nitrile rubber which is knife-over-roll coated onto the fabric. By coating the fabric with a polymeric layer, the surface of the fabric is filled in such that a smooth surface is present on at least the side which is coated with the thin printing surface layer.

After the image reinforcement layer 18 is applied to the blanket carcass 12, the printing surface layer 20 may be applied to the image reinforcement layer by a number of methods including knife-over-roll coating, calendering, electrostatic or non-electrostatic spray coating, slot die coating, gravure coating, reverse roll coating, extrusion coating, and extrusion-lamination. Alternatively, the printing surface can be extruded or calendered in web form as a free or supported film which can be laminated to the image reinforcement layer by bonding methods known in the art such as adhesive coating and lamination or by direct lamination using heat and/or pressure.

While the method of making the image transfer product has been described herein primarily with regard to a printing blanket, it should be appreciated that the printing and image reinforcement layers may also be applied to a generally cylindrical base sleeve by many of the same methods described above. Where the image reinforcement layer comprises a cast urethane, a preferred method of applying the urethane to a sleeve is spraying, knife-coating, or rotary casting. Where the image reinforcement layer comprises fabric, the fabric may be applied in the form of an extensible "sock" that can be stretched and fitted over the sleeve. Alternatively, the fabric may be provided in the form of spun cord which is wound around the base sleeve to provide the desired smooth surface.

Figure 2:
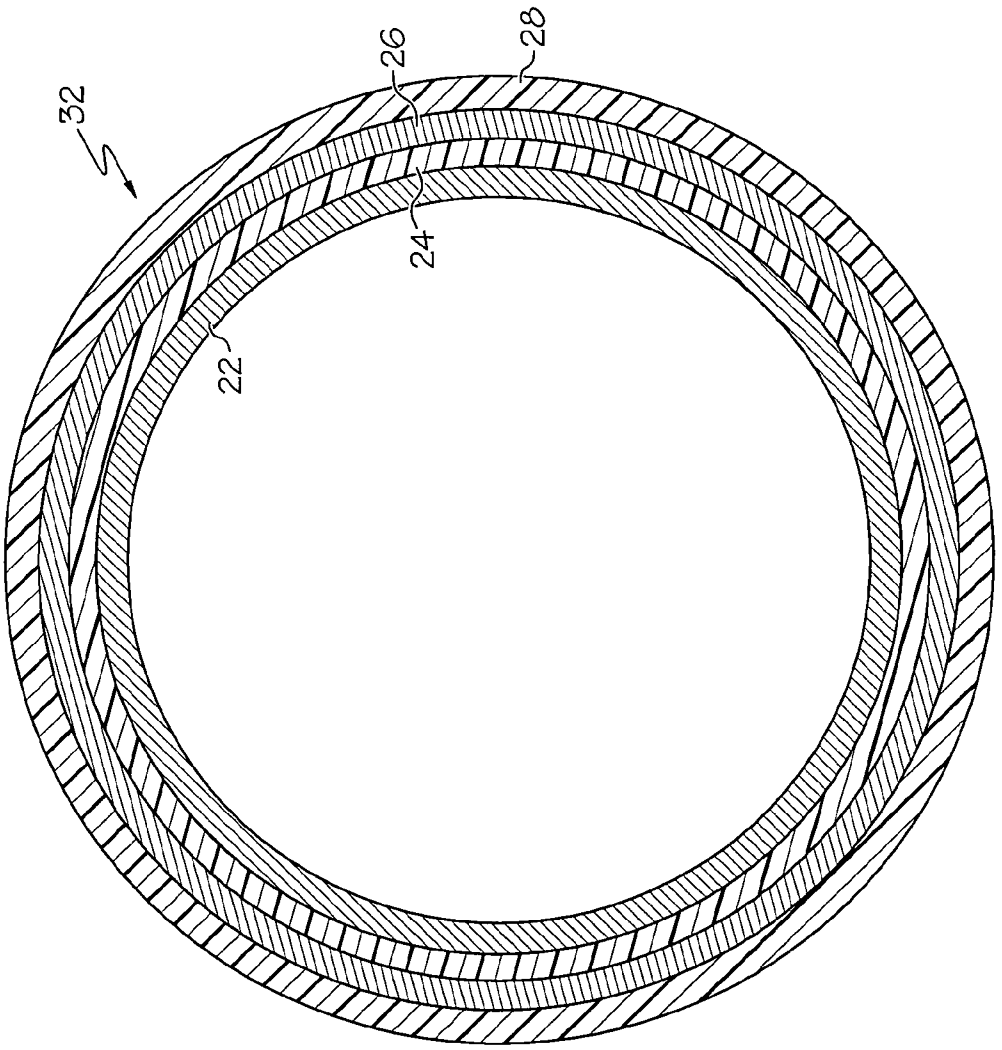
FIG. 2 is a cross-sectional view of a printing sleeve construction including an image reinforcing layer and a thin printing surface layer in accordance with another embodiment of the invention.

Referring now to FIG. 2, an image transfer product 32 is shown in the form of a printing sleeve which includes a base sleeve 22. The sleeve further includes an optional compressible layer 24, an image reinforcement layer 26, and a thin printing surface layer 28. In the method of forming the printing sleeve, the image reinforcement layer 26 may be applied to the sleeve by coating or lamination over the base sleeve 22 or compressible layer 26, if included. Alternatively, the image reinforcement layer may be applied in the form of a "sock" which fits over the sleeve or wound around the base sleeve as described above.

The printing surface layer 28 may be applied to the image reinforcement layer as an inverted extruded tube that is blown over the image reinforcement layer by means well known in the art or by a number of other methods including knife coating, calendaring, electrostatic or non-electrostatic spray coating, slot die coating, gravure coating, reverse roll coating, extrusion coating, and extrusion-lamination.

Having described the invention in detail and by reference to preferred embodiments thereof, it will be apparent that modifications and variations are possible without departing from the scope of the invention.

What is claimed is:

1. An image transfer product comprising a printing blanket or sleeve comprising a thin printing surface layer having a thickness of between about 0.001 to about 0.012 inches (about 0.025 to about 0.3 mm) over an image reinforcement layer selected from the group consisting of a 100% solids thermoplastic or thermosetting polyurethane or alloys thereof which is free of reinforcing fibers, a fabric having a denier of 150 or less, or a fabric coated with a polymer such that said fabric has a smooth surface.

2. The image transfer product of claim 1 comprising a printing blanket; said blanket including a blanket carcass with the image reinforcement layer over the blanket carcass or comprising the uppermost layer of the blanket carcass, and the thin printing surface layer over the image reinforcement layer.

3. The image transfer product of claim 2 wherein said blanket carcass comprises at least one base ply comprised of fabric, film, a polymeric composite material, or metal.

4. The image transfer product of claim 1 comprising a printing sleeve including a base sleeve comprising a rigid metal, polymer, or polymer composite, where the image reinforcement layer is over the base sleeve and the thin printing surface layer is over the image reinforcement layer.

5. The image transfer product of claim 2 wherein said blanket carcass further includes a compressible layer.

6. The image transfer product of claim 4 including a compressible layer over said base sleeve.

7. The image transfer product of claim 1 wherein said printing surface layer has a thickness of between about 0.002 to about 0.007 inches (about 0.05 to about 0.18 mm).

8. The image transfer product of claim 1 wherein said printing surface layer is selected from nitrile rubber, hydrogenated nitrile butadiene rubber, polysulfide rubber, butyl rubber, EPDM rubber, thermoplastic and thermosetting polyurethanes, and mixtures or alloys thereof.

9. The image transfer product of claim 1 wherein said image reinforcement layer comprises a woven polyester fabric.

10. The image transfer product of claim 1 wherein said image reinforcement layer comprises a fabric coated with a polymer.

11. The image transfer product of claim 10 wherein said polymer is selected from nitrile rubber, hydrogenated nitrile butadiene rubber, butyl rubber, EPDM rubber, polyvinyl chloride, polyurethanes, and mixtures or alloys of the above materials.

12. The image transfer product of claim 1 wherein said image reinforcement layer comprises a fabric having a polymeric film laminated to its surface.

13. A method of making an image transfer product comprising a printing blanket or printing sleeve having a thin printing surface layer comprising:

providing a blanket carcass or base sleeve;

applying an image reinforcement layer to said blanket carcass or base sleeve, said image reinforcement layer selected from the group consisting of a 100% solids thermoplastic or thermosetting polyurethane or alloys thereof which is free of reinforcing fibers, a fabric having a denier of 150 or less, or a fabric coated with a polymer such that said fabric has a smooth surface; and applying a printing surface layer having a thickness of between about 0.001 to 0.012 inches (about 0.025 to about 0.3 mm) to said image reinforcement layer.

14. The method of claim 13 further including applying a compressible layer to said blanket carcass or base sleeve prior to applying said image reinforcement layer.

15. The method of claim 13 wherein said base sleeve comprises a rigid metal, polymer, or polymer composite support sleeve.

16. The method of claim 13 wherein said printing surface layer is applied by knife-over-roll coating, calendering, non-electrostatic and electrostatic spray coating, or extrusion-lamination.

17. The method of claim 13 wherein said image reinforcement layer comprises a 100% solids polyurethane which is applied in liquid form by knife-over-roll coating, calendering, pneumatic or electrostatic spray coating, slot die coating, or extrusion.

18. The method of claim 13 wherein said image reinforcement layer is applied by lamination.

* * * * *